United States Patent
Liu et al.

(10) Patent No.: US 9,800,335 B2
(45) Date of Patent: Oct. 24, 2017

(54) VISIBLE LIGHT SIGNAL TRANSMITTING AND RECEIVING PROCESSING METHOD, TRANSMITTING TERMINAL, RECEIVING TERMINAL, AND SYSTEM

(71) Applicant: KUANG-CHI INNOVATIVE TECHNOLOGY LTD., Shenzhen (CN)

(72) Inventors: Ruopeng Liu, Shenzhen (CN); Guangjin Xiao, Shenzhen (CN)

(73) Assignee: KUANG-CHI INNOVATIVE TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/084,684

(22) Filed: Mar. 30, 2016

(65) Prior Publication Data

US 2016/0211915 A1    Jul. 21, 2016

Related U.S. Application Data

(63) Continuation of application No. PCT/CN2014/079348, filed on Jun. 6, 2014.

(30) Foreign Application Priority Data

Sep. 30, 2013    (CN) .......................... 2013 1 0465626

(51) Int. Cl.
*H04B 10/00* (2013.01)
*H04B 10/24* (2006.01)
(Continued)

(52) U.S. Cl.
CPC .......... *H04B 10/116* (2013.01); *H04B 10/11* (2013.01); *H04B 10/50* (2013.01); *H04K 1/02* (2013.01)

(58) Field of Classification Search
USPC ............................ 398/118, 43, 127; 380/270
See application file for complete search history.

(56) References Cited

U.S. PATENT DOCUMENTS 6,498,871 B1 * 12/2002 Kuboki ............... H04B 10/506
                                                             385/24
7,155,016 B1 * 12/2006 Betts ................. H04L 25/03866
                                                             380/221
(Continued)

FOREIGN PATENT DOCUMENTS

CN    102215068 A    10/2011
CN    102780695 A    11/2012
(Continued)

*Primary Examiner* — David Payne
*Assistant Examiner* — Pranesh Barua
(74) *Attorney, Agent, or Firm* — Perkins Coie LLP (57) ABSTRACT

The present invention discloses a visible light signal transmitting and receiving processing method, a transmitting terminal, a receiving terminal, and a system. The method includes: performing, by a transmitting terminal, an operation between data to be sent and a pseudocode signal of the transmitting terminal to output a scrambled code signal; combining, by the transmitting terminal, the scrambled code signal with a light guide signal to obtain a signal to be sent, where the light guide signal includes identity information of the transmitting terminal; and transmitting, by the transmitting terminal, the signal to be sent in light form. The present invention solves a problem that an encryption method for visible light communication in a related art is applicable to only one transmitting terminal, and thereby multiple transmitting terminals can be supported.

7 Claims, 9 Drawing Sheets

(51) Int. Cl.
  *H04B 10/116* (2013.01)
  *H04B 10/11* (2013.01)
  *H04B 10/50* (2013.01)
  *H04K 1/02* (2006.01)

(56) References Cited

U.S. PATENT DOCUMENTS

| | | | | |
|---|---|---|---|---|
| 7,333,518 B2* | 2/2008 | Sakai | .................... | H04L 1/205 370/276 |
| 7,778,548 B2* | 8/2010 | Yamamoto | ......... | H04B 10/1149 372/26 |
| 8,248,467 B1* | 8/2012 | Ganick | ................ | G01C 21/206 340/13.24 |
| 2007/0147843 A1* | 6/2007 | Fujiwara | ............ | H04B 10/1143 398/118 |
| 2008/0131117 A1* | 6/2008 | Cho | ...................... | H04J 3/1652 398/45 |
| 2008/0145056 A1* | 6/2008 | Boldi | ................. | H04J 14/0226 398/96 |
| 2010/0111521 A1* | 5/2010 | Kim | .......................... | H04L 1/24 398/10 |
| 2010/0266126 A1* | 10/2010 | Kymissis | .................. | F41H 3/02 380/270 |
| 2011/0176803 A1* | 7/2011 | Song | ................... | H04B 10/116 398/43 |
| 2012/0076301 A1* | 3/2012 | Kanter | .................... | H04K 1/02 380/256 |
| 2012/0155856 A1* | 6/2012 | Ota | ..................... | H04B 10/504 398/9 |
| 2013/0004164 A1* | 1/2013 | Toscano | .................... | H04J 3/14 398/34 |
| 2013/0230316 A1* | 9/2013 | Hussain | .............. | H04J 14/0272 398/34 |
| 2013/0266314 A1* | 10/2013 | Lee | .................... | H04B 10/2507 398/43 |
| 2013/0272716 A1* | 10/2013 | Lopez | ................ | H04B 10/1141 398/127 |
| 2013/0286847 A1* | 10/2013 | Schmidt | .............. | H04J 14/0258 370/241 |
| 2013/0336662 A1* | 12/2013 | Murayama | ........... | H04B 10/116 398/130 |
| 2013/0343762 A1* | 12/2013 | Murayama | ........... | H04B 10/1141 398/130 |
| 2014/0255036 A1* | 9/2014 | Jovicic | ................. | H04B 10/116 398/115 |
| 2015/0030335 A1* | 1/2015 | Son | ..................... | H04B 10/116 398/118 |
| 2015/0110491 A1* | 4/2015 | Gayrard | ........... | H03M 13/2906 398/79 |

FOREIGN PATENT DOCUMENTS

| | | |
|---|---|---|
| CN | 102833065 A | 12/2012 |
| CN | 103795487 A | 5/2014 |

* cited by examiner

VISIBLE LIGHT SIGNAL TRANSMITTING AND RECEIVING PROCESSING METHOD, TRANSMITTING TERMINAL, RECEIVING TERMINAL, AND SYSTEM

CROSS REFERENCE TO RELATED APPLICATIONS

This application is a continuation of PCT Application No. PCT/CN2014/079348 filed on Jun. 6, 2014, which claims priority of Chinese Patent Application No. 201310465626.5 of Sep. 30, 2013, both of which are incorporated herein by reference.

TECHNICAL FIELD

The disclosure relates to the communication field, and in particular, to a visible light signal transmitting and receiving processing method, a transmitting terminal, a receiving terminal, and a system.

BACKGROUND

Optical communication includes non-visible light communication and visible light communication. An example of common non-visible light communication is infrared communication. Infrared communication uses an infrared ray as an information transmission medium, namely, a communication channel. A transmitting terminal modulates a baseband binary signal into a series of pulse signals, and transmits an infrared signal by using an infrared emitter. A receiving terminal converts a received light pulse signal into an electrical signal, performs processing such as amplification and filtering, and then sends the signal to a demodulation circuit for demodulation, so that a binary digital signal is restored and output. Common visible light communication is a short-range high-speed wireless light communications technology that is developed on a basis of an LED technology. A basic principle of visible light communication is that communication is performed by flashing an LED light source at a high frequency based on a characteristic that a switching speed of an LED is higher than that of a fluorescent lamp and an incandescent lamp. Presence of light represents 1, and absence of light represents 0. Information is obtained after a high-speed light signal undergoes photoelectric conversion.

In the wireless light communications technology, data is unlikely to be interfered with or captured, and an optical communication device can be easily made and is unlikely to be damaged or degaussed. Therefore, the wireless light communications technology can be used to make a wireless optical encryption key. Compared with microwave technologies, the wireless light communication has abundant spectrum resources, which is incomparable with general microwave communication and wireless communication. In addition, the visible light communication is applicable to any communications protocol, and applicable to any environment. In terms of security, in contrast to conventional magnetic materials, there is no need to worry about a problem of degaussing or even to worry about unlawful interception of communication content; and a wireless optical communication device features flexible and convenient installation and layout, and a low cost, and is applicable to large-scale popularity and application.

Considering security of a light signal, a technical solution to encryption and decryption based on a light guide signal is provided in a related art. In the technical solution, a transmitting terminal encrypts an original signal and a light guide signal by using a pseudocode signal, and obtains a scrambled code signal after encoding; and a receiving terminal decrypts the encrypted original signal by using the descrambled light guide signal. Because a varying scrambled code signal is transmitted between the transmitting terminal and the receiving terminal and is unlikely to be cracked, security of signal transmission is ensured.

In the related art, before encoding is performed, the light guide signal is a group of binary digital sequences of all "1s"; after an operation is performed with a pseudocode sequence, a scrambled code signal that varies with the pseudocode sequence is obtained. By using information of the light guide signal, the receiving terminal finds the pseudocode sequence used by the transmitting terminal for encrypting the original signal, and decrypts an encrypted data part by using the found pseudocode sequence, to finally restore real original data information such as a user identity ID. Because the unscrambled light guide signal at the transmitting terminal is a group of binary digital sequences of all "1s", and the receiving terminal stores only a unique user identity, the foregoing technical solution is applicable to only one transmitting terminal.

Currently, no effective solution to the foregoing problem is provided yet.

SUMMARY

Embodiments of the present invention provide a visible light signal transmitting and receiving processing method, a transmitting terminal, a receiving terminal, and a system to at least solve the problem that the encryption method for visible light communication in the related art is applicable to only one transmitting terminal.

According to one aspect of the embodiments of the present invention, a visible light signal transmitting processing method is provided and includes: performing, by a transmitting terminal, an operation between data to be sent and a pseudocode signal of the transmitting terminal to output a scrambled code signal; combining, by the transmitting terminal, the scrambled code signal with a light guide signal to obtain a signal to be sent, where the light guide signal includes identity information of the transmitting terminal; and transmitting, by the transmitting terminal, the signal to be sent in light form.

Preferably, the performing, by a transmitting terminal, an operation between data to be sent and a pseudocode signal of the transmitting terminal to output a scrambled code signal includes: outputting, by the transmitting terminal, a time-varying pseudocode signal according to a status of a state machine of the transmitting terminal; and performing, by the transmitting terminal, an operation between the pseudocode signal and the data to be sent to output the scrambled code signal.

Preferably, the light guide signal further includes: identity information of one or more groups to which the transmitting terminal belongs, where the group is used to indicate rights of transmitting terminals that belong to the group.

Preferably, the light guide signal includes identification information and the identity information of the transmitting terminal.

Preferably, the identification information is a binary digital sequence of consecutive 1s.

Preferably, the identity information of the transmitting terminal is a device identity of the transmitting terminal.

According to another aspect of the embodiments of the present invention, a visible light signal receiving processing method is further provided and includes: receiving, by a receiving terminal, a light signal, and converting the light signal into a digital signal; splitting, by the receiving terminal, the digital signal into a scrambled code signal and a light guide signal, where the light guide signal includes identity information of a transmitting terminal; and decoding, by the receiving terminal, the scrambled code signal by using a pseudocode signal corresponding to the transmitting terminal, to obtain data transmitted by the transmitting terminal.

Preferably, the decoding, by the receiving terminal, the scrambled code signal by using a pseudocode signal corresponding to the transmitting terminal, to obtain data transmitted by the transmitting terminal, includes: acquiring, by the receiving terminal according to the identity information of the transmitting terminal, the pseudocode signal corresponding to the transmitting terminal; and decoding, by the receiving terminal, the scrambled code signal by using the pseudocode signal corresponding to the transmitting terminal.

Preferably, the acquiring, by the receiving terminal, the pseudocode signal according to the identity information of the transmitting terminal, includes: acquiring, by the receiving terminal according to the identity information of the transmitting terminal, a status code corresponding to the transmitting terminal; and obtaining, by the receiving terminal according to the status code corresponding to the transmitting terminal, a pseudocode signal corresponding to the status code.

Preferably, in a case in which the data transmitted by the transmitting terminal includes a user identity, after the receiving terminal obtains the user identity by decoding the scrambled code signal by using the pseudocode signal, the method further includes: verifying, by the receiving terminal, whether the user identity received from the transmitting terminal is the same as or corresponds to a user identity prestored by the receiving terminal, and if the user identity received from the transmitting terminal is the same as or corresponds to the prestored user identity, determining that the user identity transmitted by the transmitting terminal is legal, or otherwise, determining that the user identity transmitted by the transmitting terminal is illegal.

Preferably, the receiving terminal determines, according to a correspondence between transmitting terminal identity information and group, one or more groups to which the transmitting terminal belongs, where the group is used to indicate rights of transmitting terminals that belong to the group; or in a case in which the light guide signal further carries identity information of one or more groups to which the transmitting terminal belongs, the receiving terminal determines, according to the identity information of the one or more groups that is carried in the light guide signal, the one or more groups to which the transmitting terminal belongs, where the group is used to indicate rights of transmitting terminals that belong to the group.

Preferably, the identity information of the transmitting terminal is a device identity of the transmitting terminal.

According to another aspect of the embodiments of the present invention, a visible light signal transmitting terminal is further provided and includes: a pseudocode signal generator, configured to generate a pseudocode signal; an arithmetic unit, configured to perform an operation between data to be sent and the pseudocode signal of the transmitting terminal to output a scrambled code signal; a combining apparatus, configured to combine the scrambled code signal with a light guide signal to obtain a signal to be sent, where the light guide signal includes identity information of the transmitting terminal; and a light emitting unit, configured to transmit the signal to be sent in light form.

Preferably, the pseudocode signal generator is configured to output a time-varying pseudocode signal according to a status of a state machine of the transmitting terminal.

Preferably, the light guide signal further includes: identity information of one or more groups to which the transmitting terminal belongs, where the group is used to indicate rights of transmitting terminals that belong to the group.

Preferably, the light guide signal includes a binary digital sequence of consecutive 1s and the identity information of the transmitting terminal.

Preferably, the identity information of the transmitting terminal is a device identity of the transmitting terminal.

According to another aspect of the embodiments of the present invention, a visible light signal receiving terminal is further provided and includes: a demodulator, configured to convert a received light signal into a digital signal; a splitting apparatus, configured to split the digital signal into a scrambled code signal and a light guide signal, where the light guide signal includes identity information of a transmitting terminal; a pseudocode generator, configured to acquire a pseudocode signal; and an arithmetic unit, configured to decode the scrambled code signal by using the pseudocode signal, to obtain data transmitted by the transmitting terminal.

Preferably, the pseudocode generator is configured to acquire the pseudocode signal according to the identity information of the transmitting terminal.

Preferably, the pseudocode generator is configured to acquire a corresponding status code according to the identity information of the transmitting terminal, and obtain, according to the status code, a pseudocode signal corresponding to the status code.

Preferably, the receiving terminal further includes a decider, configured to: in a case in which the data transmitted by the transmitting terminal includes a user identity, verify whether the user identity received from the transmitting terminal is the same as or corresponds to a user identity prestored by the receiving terminal, and if the user identity received from the transmitting terminal is the same as or corresponds to the prestored user identity, determine that the user identity transmitted by the transmitting terminal is legal, or otherwise, determine that the user identity transmitted by the transmitting terminal is illegal.

Preferably, the receiving terminal is further configured to determine, according to a correspondence between transmitting terminal identity information and group, one or more groups to which the transmitting terminal belongs, where the group is used to indicate rights of transmitting terminals that belong to the group; or in a case in which the light guide signal further carries identity information of one or more groups to which the transmitting terminal belongs, the receiving terminal is further configured to determine, according to the identity information of the one or more groups that is carried in the light guide signal, the one or more groups to which the transmitting terminal belongs, where the group is used to indicate rights of transmitting terminals that belong to the group.

Preferably, the identity information of the transmitting terminal is a device identity of the transmitting terminal.

According to another aspect of the embodiments of the present invention, a visible light signal processing system is provided and includes any one of the foregoing visible light signal transmitting terminals and any one of the foregoing visible light signal receiving terminals.

In the embodiments of the present invention, a light guide signal includes identity information of a transmitting terminal, so that the problem that the encryption method for visible light communication in the related art is applicable to only one transmitting terminal is solved, and thereby multiple transmitting terminals can be supported.

BRIEF DESCRIPTION OF DRAWINGS

The accompanying drawings described herein are used to provide a further understanding about the present invention, and constitute a part of the present application. Exemplary embodiments of the present invention and descriptions thereof are used to explain the present invention, but do not constitute any inappropriate limitation on the present invention.

EMBODIMENTS

The following describes the present invention in detail with reference to the accompanying drawings and embodiments. It should be noted that the embodiments in the present application and features in the embodiments may be combined with each other in a case of no conflict.

In the embodiments of the present invention, a visible light signal transmitting processing method is provided.

Figure 1:
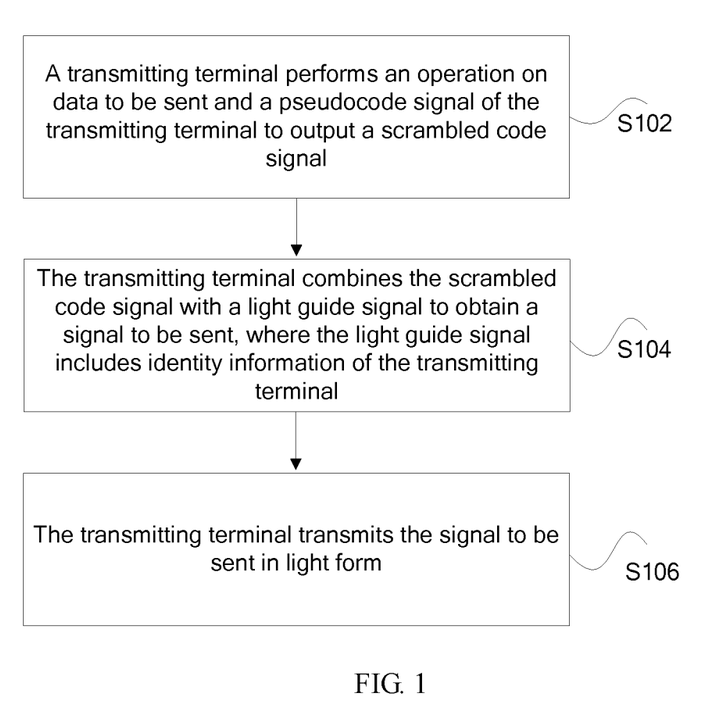
FIG. 1 is a flowchart of a visible light signal transmitting processing method according to an embodiment of the present invention.

FIG. 1 is a flowchart of a visible light signal transmitting processing method according to an embodiment of the present invention. As shown in FIG. 1, the process includes:

Step S102: A transmitting terminal performs an operation (for example, a logic operation, which is used as an example for description hereinafter) on data to be sent (the data to be sent will become an original signal hereinafter) and a pseudocode signal of the transmitting terminal to output a scrambled code signal.

Step S104: The transmitting terminal combines the scrambled code signal with a light guide signal to obtain a signal to be sent, where the light guide signal includes identity information of the transmitting terminal.

Step S106: The transmitting terminal transmits the signal to be sent in light form.

In the foregoing steps, the light guide signal includes the identity information of the transmitting terminal. In contrast to the related art in which a light guide signal is a sequence of all 1s, light guide signals of different transmitting terminals are different from each other, and a receiving terminal may determine different transmitting terminals according to identity information of the transmitting terminals in the light guide signals. Therefore, the problem that the encryption method for visible light communication in the related art is applicable to only one transmitting terminal is solved, and thereby multiple transmitting terminals can be supported.

Figure 2:
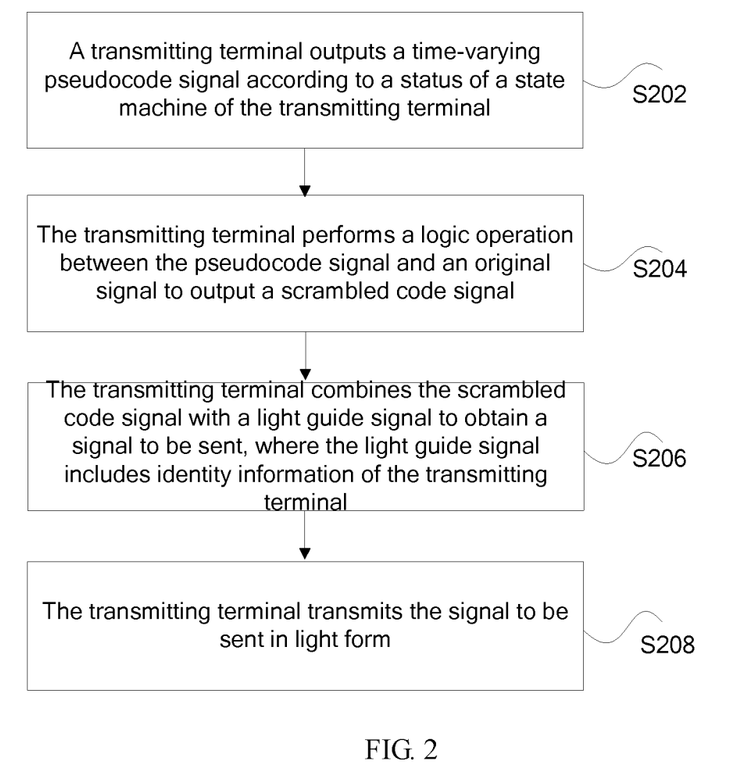
FIG. 2 is a flowchart of performing encryption by using a varying pseudocode signal according to an embodiment of the present invention.

In a preferred implementation manner, for higher security, an original signal may be encrypted by using a varying pseudocode signal. FIG. 2 is a flowchart of performing encryption by using a varying pseudocode signal according to an embodiment of the present invention. As shown in FIG. 2, the process includes the following steps:

Step S202: A transmitting terminal outputs a time-varying pseudocode signal according to a status of a state machine of the transmitting terminal.

Step S204: The transmitting terminal performs a logic operation between the pseudocode signal and an original signal to output a scrambled code signal.

Step S206: The transmitting terminal combines the scrambled code signal with a light guide signal to obtain a signal to be sent, where the light guide signal includes identity information of the transmitting terminal.

Step S208: The transmitting terminal transmits the signal to be sent in light form.

In the foregoing steps, statuses of the transmitting terminal and receiving terminal will change with time, and a used pseudocode sequence will also change continuously according to the statuses. Therefore, when the transmitting terminal performs transmission, the original signal is encrypted by using a pseudocode sequence corresponding to the current status. Because of the change of the pseudocode sequence, security is higher.

In the foregoing steps, the problem in the related art may be solved so long as the light guide signal includes the identity information of the transmitting terminal. In a preferred implementation manner, the light guide signal may further include some other information, where the other information may be used for other purposes. The following uses two preferred implementation manners for description.

In the foregoing steps, the state machine may be implemented in multiple manners. The implementation may be using a status module in a device, or may be using a module that can acquire environment data and user data, for example, a sensor, to extract a status code from the environment data or user data, for example, time-varying information, which may be vital sign information, such as blood pressure and heart rate.

In a first preferred implementation manner, the light guide signal may further include identity information of a group to which the transmitting terminal belongs, where the group is used to indicate rights of transmitting terminals that belong to the group. By using the group identity information in the light guide signal, rights of transmitting terminals may be defined in a group manner. For example, the transmitting terminal may be a visible light access card, and access cards used by different people are different. Each access card has its device identity information, so that different access cards are distinguished.

In this case, a group to which the access card belongs may be added to the light guide signal. For example, if the access card belongs to a management group, the access card may be used to open a door even at a weekend; if the access card belongs to a common staff group, the access card cannot be used to open a door at a non-working weekend.

Different groups indicate different rights of transmitting terminals.

In another more preferred implementation manner, the group may be one or more group. Multiple groups may be used to identify different rights. Different groups may also be used to indicate different layers. For example, if a device in a city is unique, for example, a public transportation card, different groups may be used to identify different layers, such as a city, a community, a building, a company, and a user.

In a second preferred implementation manner, the light guide signal may further include identification information and the identity information of the transmitting terminal. The identification information is preferably a binary digital sequence of consecutive 1s. Use of the binary digital sequence of consecutive 1s is more advantageous for identifying the light guide signal. The signal of consecutive is can be identified easily. Because identity information included in light guide signals varies, after the signal of consecutive 1s is added, the identity information of the transmitting terminal is located, for example, after prescribed 10 consecutive 1s. Thereby, identity information after the 10 consecutive 1s can be easily identified, and identification accuracy can be improved. It should be noted that the signal of consecutive 1s is only a preferred implementation manner, which is not limited.

Figure 3:
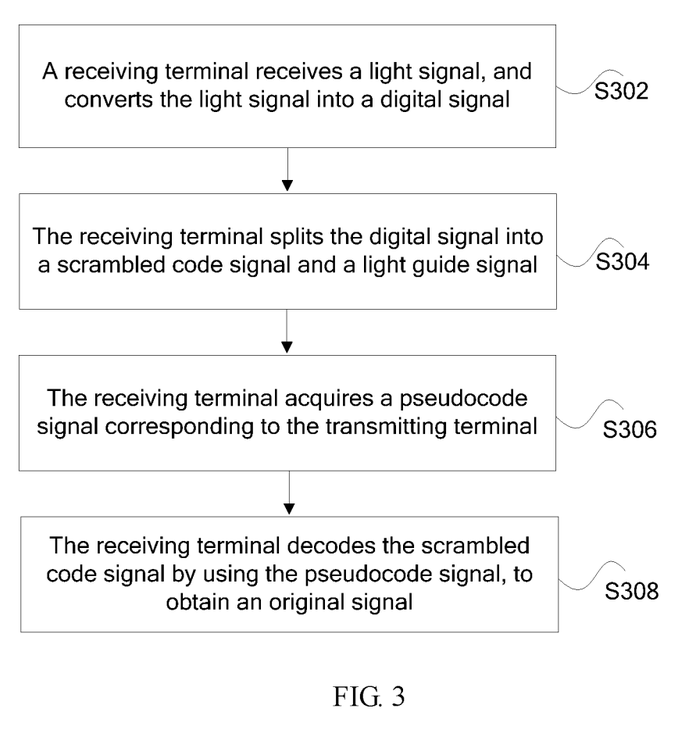
FIG. 3 is a flowchart of a visible light signal receiving processing method according to an embodiment of the present invention.

The process described in the foregoing embodiment is described from a perspective of a transmitting terminal. FIG. 3 is a flowchart of a visible light signal receiving processing method according to an embodiment of the present invention. As shown in FIG. 3, the process includes the following steps:

Step S302: A receiving terminal receives a light signal, and converts the light signal into a digital signal.

Step S304: The receiving terminal splits the digital signal into a scrambled code signal and a light guide signal, where the light guide signal includes identity information of a transmitting terminal.

Step S306: The receiving terminal acquires a pseudocode signal corresponding to the transmitting terminal, for example, may acquire, according to the identity information of the transmitting terminal, the pseudocode signal corresponding to the transmitting terminal.

Step S308: The receiving terminal decodes the scrambled code signal by using the pseudocode signal, to obtain an original signal.

In the foregoing steps, the light guide signal includes the identity information of the transmitting terminal. In contrast to the related art in which a light guide signal is a sequence of all 1 s, light guide signals of different transmitting terminals are different from each other, and the receiving terminal may determine different transmitting terminals according to identity information of the transmitting terminals in the light guide signals. Therefore, the problem that the encryption method for visible light communication in the related art is applicable to only one transmitting terminal is solved, and thereby multiple transmitting terminals can be supported.

Figure 4:
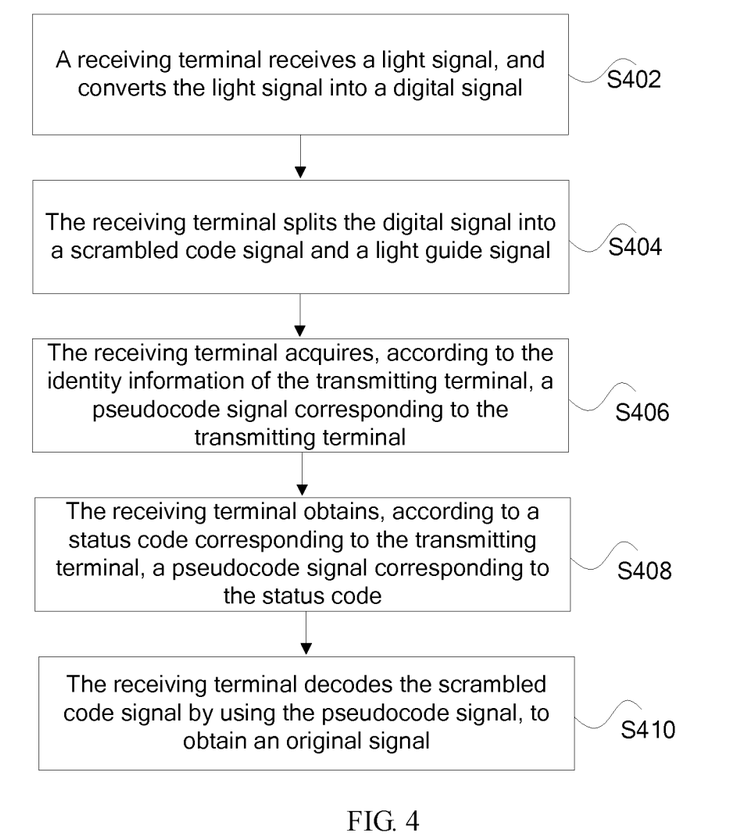
FIG. 4 is a flowchart of performing decryption by using a varying pseudocode signal according to an embodiment of the present invention.

In a preferred implementation manner, for higher security, an original signal may be encrypted by using a varying pseudocode signal, and in this case, the receiving terminal also needs to obtain the corresponding pseudocode signal. FIG. 4 is a flowchart of performing decryption by using a varying pseudocode signal according to an embodiment of the present invention. As shown in FIG. 4, the process includes the following steps:

Step S402: A receiving terminal receives a light signal, and converts the light signal into a digital signal.

Step S404: The receiving terminal splits the digital signal into a scrambled code signal and a light guide signal, where the light guide signal includes identity information of a transmitting terminal.

Step S406: The receiving terminal acquires, according to the identity information of the transmitting terminal, a pseudocode signal corresponding to the transmitting terminal.

Step S408: The receiving terminal obtains, according to a status code corresponding to the transmitting terminal, a pseudocode signal corresponding to the status code.

Step S410: The receiving terminal decodes the scrambled code signal by using the pseudocode signal, to obtain an original signal.

In the foregoing steps, statuses of the transmitting terminal and receiving terminal will change with time, and a used pseudocode sequence will also change continuously according to the statuses. Therefore, when the transmitting terminal performs transmission, the original signal is encrypted by using a pseudocode sequence corresponding to the current status, and the receiving terminal also performs decryption by using the corresponding pseudocode sequence. Because of the change of the pseudocode sequence, security is higher.

Figure 5:
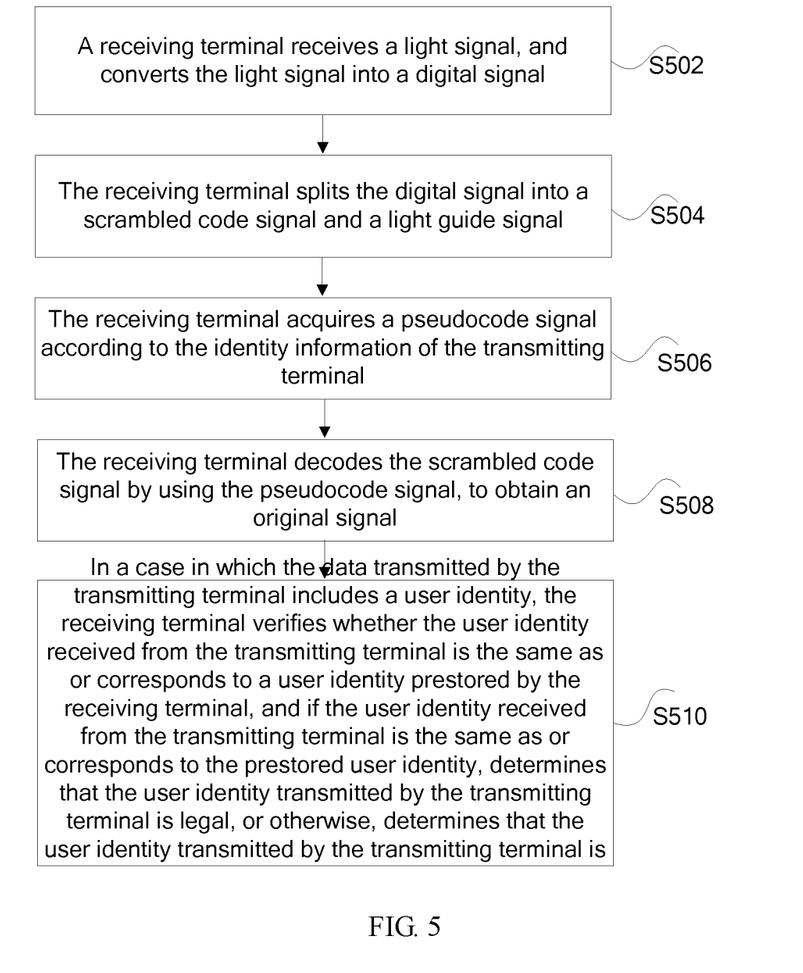
FIG. 5 is a flowchart of a signal receiving processing method in which verification of an original signal is added according to an embodiment of the present invention.

In a preferred embodiment, a data verification step may be further added. FIG. 5 is a flowchart of a signal receiving processing method in which verification of an original signal is added according to an embodiment of the present invention. As shown in FIG. 5, the process includes the following steps:

Step S502: A receiving terminal receives a light signal, and converts the light signal into a digital signal.

Step S504: The receiving terminal splits the digital signal into a scrambled code signal and a light guide signal, where the light guide signal includes identity information of a transmitting terminal.

Step S506: The receiving terminal acquires a pseudocode signal according to the identity information of the transmitting terminal.

Step S508: The receiving terminal decodes the scrambled code signal by using the pseudocode signal, to obtain an original signal.

Step S510: In a case in which the data transmitted by the transmitting terminal includes a user identity, the receiving terminal verifies whether the user identity received from the transmitting terminal is the same as or corresponds to a user identity prestored by the receiving terminal, and if the user identity received from the transmitting terminal is the same as or corresponds to the prestored user identity, determines that the user identity transmitted by the transmitting terminal is legal, or otherwise, determines that the user identity transmitted by the transmitting terminal is illegal.

In the foregoing steps, the data transmitted by the transmitting terminal may be a user identity, and the receiving terminal may use the user identity to perform corresponding processing. The receiving terminal may preset all user identities that the receiving terminal can process. In this way, after receiving the user identity transmitted by the transmitting terminal, the receiving terminal may determine whether the user identity transmitted by the transmitting terminal exists in the user identities prestored by the receiving terminal, and thereby reliability may be improved.

In the foregoing steps, the problem in the related art may be solved so long as the light guide signal includes the identity information of the transmitting terminal. In a preferred implementation manner, the light guide signal may further include some other information, where the other information may be used for other purposes. The following uses two preferred implementation manners for description.

In a first preferred implementation manner, the light guide signal may further include identity information of a group to which the transmitting terminal belongs, where the group is used to indicate rights of transmitting terminals that belong to the group. By using the group identity information in the light guide signal, rights of transmitting terminals may be defined in a group manner. That is, in a case in which the light guide signal further carries the identity information of the group to which the transmitting terminal belongs, the receiving terminal determines, according to the identity information of the group that is carried in the light guide signal, the group to which the transmitting terminal belongs, where the group is used to indicate the rights of the transmitting terminals that belong to the group.

In a variant implementation manner of the first preferred implementation manner, the identity information of the group may not be carried in the light guide signal, but the group to which the transmitting terminal belongs is determined according to the identity information of the transmitting terminal. In this way, less data is carried in the light guide signal, and the receiving terminal needs to perform more processing. That is, the receiving terminal determines, according to a correspondence between transmitting terminal identity information and group, the group to which the transmitting terminal belongs, where the group is used to indicate the rights of the transmitting terminals that belong to the group. For example, the identity information of the transmitting terminal is 110001, and the receiving terminal stores the group corresponding to 110001, that is, the receiving terminal stores the correspondence between the identity information of the transmitting terminal and the group corresponding to the identity information of the transmitting terminal. In this way, the light guide signal may not carry the identity information of the group.

In a second preferred implementation manner, the light guide signal may further include a binary digital sequence of consecutive 1s and the identity information of the transmitting terminal. The binary digital sequence of consecutive 1s may be more advantageous for identifying the light guide signal.

Figure 6:
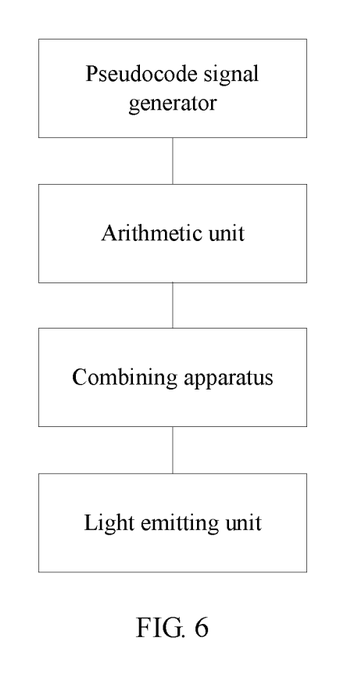
FIG. 6 is a structural block diagram of a visible light signal transmitting terminal according to an embodiment of the present invention.

Corresponding to the foregoing method, an embodiment further provides a visible light signal transmitting terminal. FIG. 6 is a structural block diagram of a visible light signal transmitting terminal according to an embodiment of the present invention. As shown in FIG. 6, the structure includes:

a pseudocode signal generator, configured to generate a pseudocode signal;

an arithmetic unit, configured to perform an operation between an original signal and the pseudocode signal of the transmitting terminal to output a scrambled code signal, where the arithmetic unit may be a digital arithmetic logic unit;

a combining apparatus, configured to combine the scrambled code signal with a light guide signal to obtain a signal to be sent, where the light guide signal includes identity information of the transmitting terminal; and a light emitting unit, configured to transmit the signal to be sent in light form.

The apparatus may be implemented by hardware or software. The apparatus solves the problem that the encryption method for visible light communication in the related art is applicable to only one transmitting terminal, and thereby multiple transmitting terminals can be supported.

Preferably, the pseudocode signal generator is configured to output a time-varying pseudocode signal according to a status of a state machine of the transmitting terminal.

Preferably, the light guide signal further includes: identity information of a group to which the transmitting terminal belongs, where the group is used to indicate rights of transmitting terminals that belong to the group.

Preferably, the light guide signal includes a binary digital sequence of consecutive 1s and the identity information of the transmitting terminal.

Figure 7:
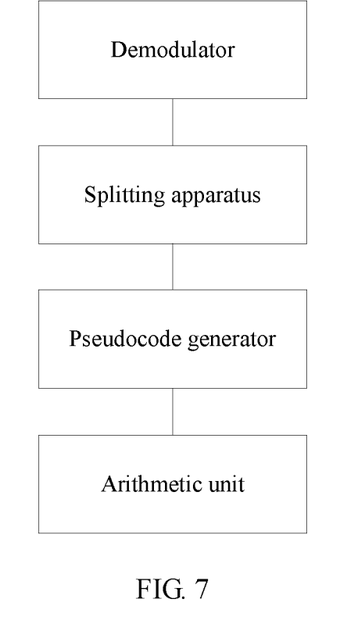
FIG. 7 is a structural block diagram of a visible light signal receiving terminal according to an embodiment of the present invention.

Corresponding to the foregoing method, an embodiment further provides a visible light signal receiving terminal. FIG. 7 is a structural block diagram of a visible light signal receiving terminal according to an embodiment of the present invention. As shown in FIG. 7, the structure includes:

a demodulator, configured to convert a received light signal into a digital signal;

a splitting apparatus, configured to split the digital signal into a scrambled code signal and a light guide signal, where the light guide signal includes identity information of a transmitting terminal;

a pseudocode generator, configured to acquire a pseudocode signal, where preferably, the pseudocode generator may acquire the pseudocode signal according to the identity information of the transmitting terminal; and an arithmetic unit, configured to decode the scrambled code signal by using the pseudocode signal, to obtain an original signal, where the arithmetic unit may be a digital arithmetic logic unit.

Preferably, the pseudocode generator is configured to acquire a corresponding status code according to the identity information of the transmitting terminal, and obtain, according to the status code, a pseudocode signal corresponding to the status code.

Preferably, the receiving terminal further includes a decider, configured to: in a case in which the data transmitted by the transmitting terminal includes a user identity, verify whether the user identity received from the transmitting terminal is the same as or corresponds to a user identity prestored by the receiving terminal, and if the user identity received from the transmitting terminal is the same as or corresponds to the prestored user identity, determine that the user identity transmitted by the transmitting terminal is legal, or otherwise, determine that the user identity transmitted by the transmitting terminal is illegal.

Preferably, the identity information of the transmitting terminal is further used to determine a group to which the transmitting terminal belongs, where the group is used to indicate rights of transmitting terminals that belong to the group; or the light guide signal further carries identity information of a group to which the transmitting terminal belongs, where the group is used to indicate rights of transmitting terminals that belong to the group. The transmitting terminal and the receiving terminal may constitute a system. Preferably, the identity information of the transmitting terminal in the foregoing embodiment may be a device identity of the transmitting terminal, a device code, a device name, or other device information that may determine the identity of the transmitting terminal.

In the foregoing embodiment and its preferred implementation manners, identity authentication may be firstly performed before the identity information of the device is determined according to the light guide signal. For example, a fingerprint may be used to verify information of a user that uses the transmitting terminal. After the authentication is passed, the solutions provided in the foregoing embodiment and its preferred implementation manners are used to verify the identity information of the transmitting terminal.

The following description is provided with reference to a preferred embodiment. In the following preferred embodiment, for example, an original signal is a user ID.

The preferred embodiment provides a method and an apparatus for encryption and decryption based on multi-user synchronization. The method and apparatus are similar to the foregoing method and apparatus for encryption and decryption based on a light guide signal.

However, in the preferred embodiment, in the method and apparatus for encryption and decryption based on multi-user synchronization, a transmitting terminal does not use a light guide signal of all "1s", but uses different signals to represent different users and device identities. A signal transmitted by each transmitting terminal includes two parts. The first part is a unique device identity corresponding to each transmitting terminal, and this part is not scrambled. The second part is a user ID, which is encrypted by using a status-varying pseudocode sequence. In addition, a receiving terminal also stores identity information (for example, the identity information may be a device identity of the transmitting terminal) and original IDs of all transmitting terminals (the original ID may be a user ID, and may be used to identify a user; the device identity is the identity information of the transmitting terminal, and is used to identify a device). The original ID in the preferred embodiment is a type of data to be sent and is not limited to this type. In the preferred embodiment, the identity information of the transmitting terminal is referred to as a device identity, and the data to be sent is referred to as an ID, where the device identity corresponds to the ID on a one-to-one basis. When the transmitting terminal and the receiving terminal perform communication for the first time, their statuses at this time are used as initial statuses, and then the statuses of the transmitting terminal and receiving terminal will change with time, and a used pseudocode signal (for example, the pseudocode signal may be a pseudocode sequence) will also change continuously according to the statuses. Therefore, when the transmitting terminal performs transmission, the transmitting terminal selects the pseudocode sequence corresponding to the current status to encrypt the ID. After receiving a light signal transmitted by a transmitting terminal, the receiving terminal restores the device identity in the signal by performing photoelectric conversion and demodulation, then finds the status corresponding to the device identity from a memory, selects a corresponding pseudocode sequence to decrypt the ID, obtains the decrypted ID, and compares the decrypted ID with the stored ID to determine whether the ID is legal.

By using the method and apparatus for encryption and decryption based on multi-user synchronization that are provided by the preferred embodiment, encryption and decryption can be implemented in a visible light communication process, and multiple users can be supported, which further enhances practical applicability.

In the preferred embodiment, the receiving terminal may further perform comparison according to the prestored ID and the decrypted ID, and check whether they are the same. If they are the same, it indicates that the transmitted ID is legal; if they are different, it indicates that the transmitted ID is illegal. In addition, because the pseudocode sequence used for encryption is decided according to different statuses as the time elapses, the pseudocode sequence used for encryption changes continuously with time. Therefore, even if a fixed user ID and light guide signal are used, after encryption of the pseudocode sequence, a varying encrypted signal is transmitted between the transmitting terminal and the receiving terminal. This type of signal is invalid for replication in a time period of different statuses, and therefore, security of signal transmission can be improved.

The following description is provided with reference to accompanying drawings.

Figure 8:
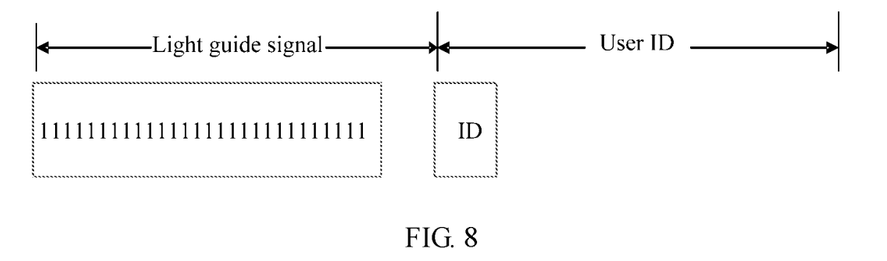
FIG. 8 is a schematic diagram of a signal format before encryption in a method and an apparatus for encryption and decryption based on a light guide signal according to the related art.

FIG. 8 is a schematic diagram of a signal format before encryption in a method and an apparatus for encryption and decryption based on a light guide signal according to the related art. As shown in FIG. 8, the signal format includes two parts: a light guide signal of all "1s" and an ID.

Figure 9:
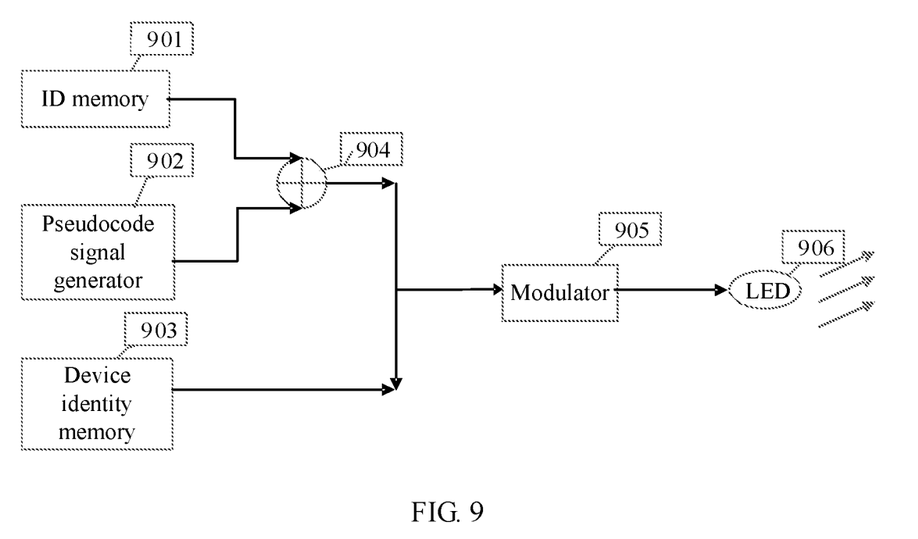
FIG. 9 is a structural block diagram of a photonic transmitting terminal according to a preferred embodiment of the present invention.

FIG. 9 is a structural block diagram of a photonic transmitting terminal according to a preferred embodiment of the present invention. As shown in FIG. 9, the transmitting terminal includes an ID memory 901, a pseudocode signal generator 902, a device identity memory 903, a digital arithmetic logic unit 904, a modulator 905, and an LED 906.

Figure 10:
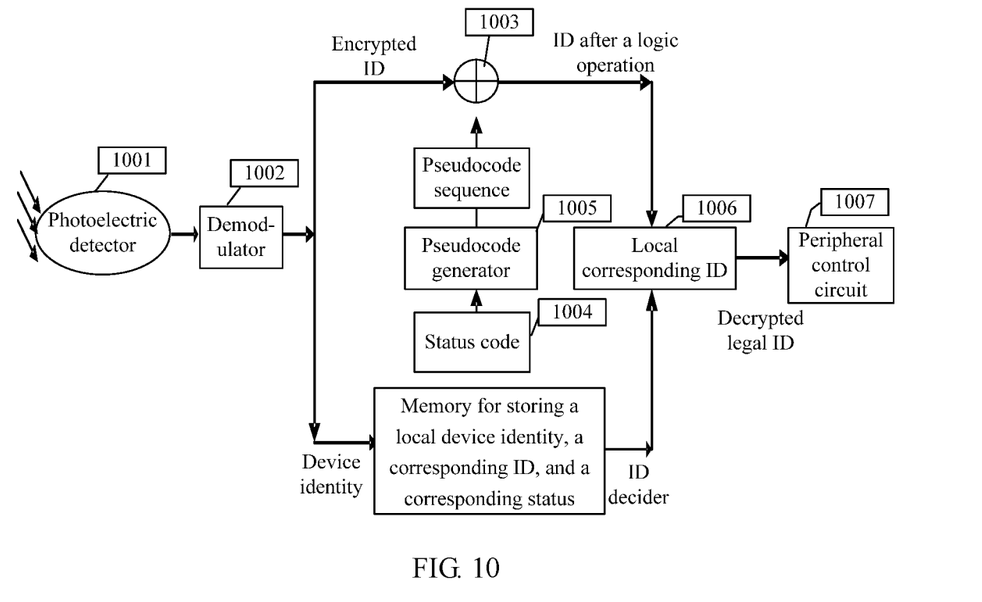
FIG. 10 is a structural block diagram of a photonic receiving terminal according to a preferred embodiment of the present invention.

FIG. 10 is a structural block diagram of a photonic receiving terminal according to a preferred embodiment of the present invention. As shown in FIG. 10, the receiving terminal includes a visible light photoelectric detector 1001, a demodulator 1002, a digital arithmetic logic unit 1003, a memory 1004 for storing a local device identity, a corresponding ID, and a corresponding status, a pseudocode generator 1005, an ID decider 1006, and a peripheral control circuit 1007.

Figure 11:
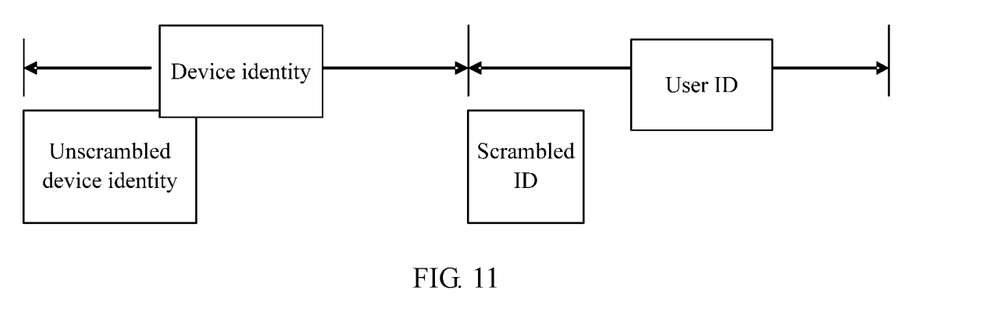
FIG. 11 is a schematic diagram of a data structure of a signal transmitted between a transmitting terminal and a receiving terminal in a method and an apparatus for encryption and decryption based on multi-user synchronization according to a preferred embodiment of the present invention.

FIG. 11 is a schematic diagram of a data structure of a signal transmitted between a transmitting terminal and a receiving terminal in a method and an apparatus for encryption and decryption based on multi-user synchronization according to a preferred embodiment of the present invention. As shown in FIG. 11, the signal includes two parts: a device identity that is not scrambled and a scrambled ID.

FIG. 9 and FIG. 10 show a visible light communication system in which the preferred embodiment may be implemented. The visible light communication system includes the transmitting terminal in FIG. 9 and the receiving terminal in FIG. 10.

The transmitting terminal in FIG. 9 includes the ID memory 901, the pseudocode generator 902 coupled to the ID memory 901, and the device identity memory 903. The ID memory 901 stores user information (such as an ID), and uses a pseudocode signal generated by the pseudocode signal generator 902 to encode ID data to generate a scrambled code signal. Because the generated scrambled code signal is different from the original ID, an encryption effect is achieved. In the present invention, the term "encrypt" is interchangeable with the term "encode", and the term "decrypt" is interchangeable with the term "decode".

The ID data read by the ID memory and the pseudocode signal generated by the pseudocode signal generator are encoded in the digital arithmetic logic unit to obtain an encrypted scrambled code signal, where the encoding mode may be an exclusive OR operation, an XNOR operation or a convolution operation, an interleaving operation, or the like. Meanwhile, the device identity memory 903 reads the device identity information of the transmitting terminal, and combines the device identity information with the generated scrambled code signal to form the data structure of the transmitted signal in the preferred embodiment described in FIG. 8. The device identity information may be inconsistent with the ID, and represent only an identity of a transmitting terminal. The device identity information is unique, and is not encrypted. A receiving terminal identifies, according to the device identity, which transmitting terminal the device identity comes from. After the scrambled code signal and the device identity are combined, the modulator 905 outputs a combined signal to a light emitting unit, namely, the LED 906, to drive the LED 906 to transmit the received signal in a visible light form. The light emitting unit may be another component capable of emitting light. The transmitting terminal may be a handheld client in a photonic Internet of things.

The receiving terminal in FIG. 10 includes the photoelectric detector 1001 configured to detect a visible light signal transmitted by the transmitting terminal, and the demodulator 1002 configured to convert the visible light signal into a digital signal. The demodulated digital signal is split into two parts according to the format of the transmitted signal: an encrypted ID signal and a device identity signal that is not encrypted. The encrypted ID part is output to the digital arithmetic logic unit 1003, and the device identity part is output to the memory 1004. After receiving the device identity signal, the memory 1004 searches the memory for a local ID corresponding to the device identity on a one-to-one basis and a status code of a corresponding status, and then transmits the status code to the pseudocode generator 1005, and transmits the local corresponding ID to the ID decider 1006. After status codes are transmitted to the pseudocode generator 1005, the pseudocode generator generates, according to the status codes, a group of scrambled sequence signals corresponding to the status codes on a one-to-one basis, then transmits the group of scrambled sequence signals to the digital arithmetic logic unit 1003, where a scrambled code signal is consistent with a scrambled code signal when the transmitting terminal is in a same state. A digital logic operation, namely, decoding, is performed on the encrypted ID signal and the pseudocode sequence signal in the digital arithmetic logic unit 1003, where the used digital logic operation mode is the same as that of the transmitting terminal. The original ID transmitted by the transmitting terminal may be restored after the digital logic operation. The ID after the digital logic operation cannot be determined to be a legal ID yet. Therefore, the ID decider 1006 further needs to determine whether the ID is legal. The local corresponding ID output by the memory 1004 and the ID that is output by the digital arithmetic logic unit 1003 after the logic operation are determined in the ID decider; if the two ID values are the same or have a correspondence, it is considered that the ID is legal, and the legal ID is transmitted to the peripheral control circuit 1007; if the two ID values are different or have no correspondence, it is considered that the ID is illegal, and the illegal ID is not transmitted to the peripheral control circuit 1007. Only one transmitting terminal is shown in the visible light communication system in the figure. However, persons skilled in the art can easily understand that multiple transmitting terminals corresponding to one receiving terminal generally exist.

In order to achieve higher security of communication between the transmitting terminal and the receiving terminal and prevent a high-speed camera from shooting and replicating a light signal, a time-varying pseudocode sequence is used at both the transmitting terminal and the receiving terminal to encrypt and decrypt the original communication data. Therefore, the pseudocode signal generator 902 uses a time signal of the transmitter as a reference, and outputs a time-varying pseudocode signal according to the status of the state machine of the transmitting terminal. Correspondingly, the memory 1004 at the receiving terminal also uses a local clock signal as a reference, and stores a time-varying status code corresponding to the device identity of the transmitting terminal, where the status code indicates a status corresponding to the transmitter when a signal of the transmitter is received. The pseudocode generator 1005 at the receiving terminal outputs a time-varying pseudocode signal correspondingly according to the input status code. Evidently, when statuses of the transmitting terminal and the receiving terminal are consistent, pseudocode sequences used by the transmitting terminal and the receiving terminal for encryption and decryption are also consistent or have a correspondence.

Figure 12:
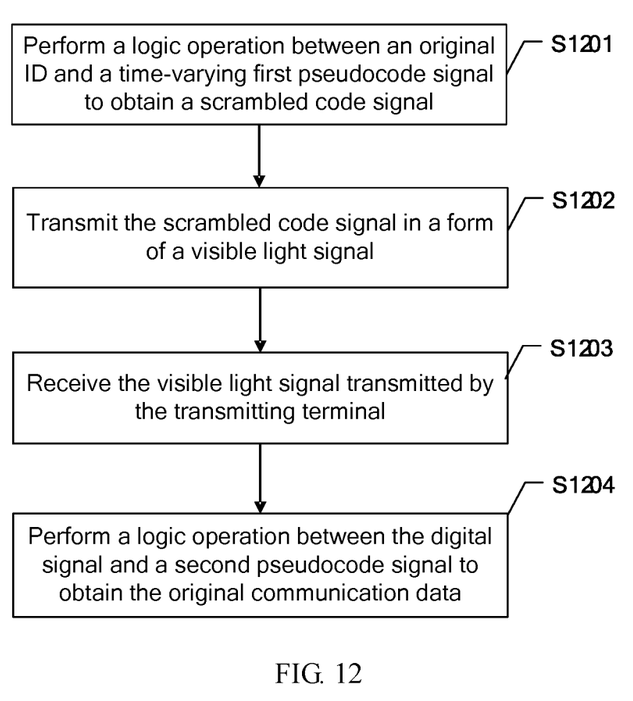
FIG. 12 is a flowchart of an encryption and decryption method used in a visible light communication system according to a preferred embodiment of the present invention.

FIG. 12 is a flowchart of an encryption and decryption method used in a visible light communication system according to a preferred embodiment of the present invention. As shown in FIG. 12, the process includes the following steps:

Step S1201: A transmitting terminal 110 performs a logic operation between an original ID and a time-varying first pseudocode signal to obtain a scrambled code signal. The original ID is a part of to-be-transmitted information, for example, user identity information, and may be a digital sequence signal. The pseudocode signal may be a digital sequence that varies with a unit time, where the unit time may be set as required, such as every day, every hour, every minute, or every second. The logic operation between the original communication data and the first pseudocode signal may be logic AND, logic OR, logic XOR, or the like, or may be a combination of two or more of the foregoing.

For example, the original ID communication data is a user ID of the transmitting terminal, and is always 00001101. When the transmitting terminal is in a corresponding state N after a unit time T elapses, the first pseudocode signal may be 10101010, and therefore, the process of the logic operation between the original ID communication data and the first pseudocode signal such as "XOR" is shown in the following table:

| Original communication data | 0 | 0 | 0 | 0 | 1 | 1 | 0 | 1 |
| First pseudocode signal | 1 | 0 | 1 | 0 | 1 | 0 | 1 | 0 |
| Scrambled code signal | 1 | 0 | 1 | 0 | 0 | 1 | 1 | 1 |

Step S1202: The transmitting terminal 110 transmits the scrambled code signal in a form of a visible light signal. For example, the transmitting terminal transmits a modulated signal in a flashing form by using an LED. For the scrambled code signal 10100111, the LED may generate high-frequency flashes. Presence of light represents 1, and absence of light represents 0, or vice versa, thereby implementing visible light communication effectively.

Step S1203: A receiving terminal 120 receives the visible light signal transmitted by the transmitting terminal 110, and converts the visible light signal into a digital signal. For example, for the high-frequency flashes generated by the LED, presence of light represents 1, and absence of light represents 0, or vice versa, and thereby the received visible light signal may be converted into a digital signal.

Step S1204: The receiving terminal 120 performs decoding, such as a logic operation, between the digital signal and a second pseudocode signal to obtain the original communication data. Preferably, when the receiving terminal is in a corresponding state N after a unit time T elapses, the second pseudocode signal is also 10101010, which has the same code pattern and the same start phase and end phase as the first pseudocode signal. A process of a logic operation, such as an "XOR" process shown in the following table, is performed on the received signal and the second pseudocode signal by the receiving terminal 120.

| Received signal | 1 | 0 | 1 | 0 | 0 | 1 | 1 | 1 |
| --- | --- | --- | --- | --- | --- | --- | --- | --- |
| Second pseudocode signal | 1 | 0 | 1 | 0 | 1 | 0 | 1 | 0 |
| Decoded output signal | 0 | 0 | 0 | 0 | 1 | 1 | 0 | 1 |

It can be seen that the decoded output signal is 00001101, which is the same as the original communication data. That is, the original communication data is decoded.

As mentioned above, in order to enable the receiving terminal to decode correctly, the pseudocode signal generated by the pseudocode signal generator at the receiving terminal needs to change synchronously with the pseudocode signal generated by the pseudocode signal generator at the transmitting terminal. Preferably, the change of the pseudocode signal is decided by statuses of state machines at the transmitting terminal and the receiving terminal. After a unit time (for example, 1 second, 1 minute or another specified duration) elapses, the statuses of the state machines of both the transmitting terminal and the receiving terminal change from a previous state to a next state. At the same time, the pseudocode signals used for encryption and decryption and corresponding to the statuses of the state machines also change in the same way.

To implement normal and correct visible light communication, the following conditions may be satisfied: 1. A frequency of a baseband signal or a frequency of a light guide signal generator and a frequency of the pseudocode generator are the same, or an integer-multiple relationship is maintained between the frequencies. 2. Statuses of the pseudocode generators at both the receiving terminal and the transmitting terminal vary with time and change in the same way.

By using the method and apparatus for encryption and decryption based on multi-user synchronization, a visible light signal transmitted by a transmitting terminal can be encrypted, and can be decrypted correctly at a receiving terminal; even if the visible light signal is replicated by a high-speed camera after shooting, because the replicated signal cannot be synchronized with a status change of the receiving terminal, in different time periods, the visible light signal can be prevented from replication and use, and security of a visible light communication system may be improved effectively to some extent.

After the encryption and decryption method is used with reference to the light guide signal in the preferred embodiment, in contrast to the technical solution of the prior art, namely, the method and apparatus for encryption and decryption based on a light guide signal in FIG. 8 in which a light guide signal of all "1s" is used, because a device identity part that may indicate different numeric values is used, the present invention is applicable to multiple transmitting terminals, and has more actual use value than the prior art that is applicable to only a single transmitting terminal.

The foregoing descriptions are merely preferred embodiments of the present invention, but are not intended to limit the present invention. Persons skilled in the art understand that the present invention may have various modifications and variations. Any modification, equivalent replacement, and improvement made without departing from the spirit and principle of the present invention shall fall within the protection scope of the present invention.

INDUSTRIAL APPLICABILITY

The technical solutions provided by the embodiments of the present invention may be applied to the communication field to solve the problem that the encryption method for visible light communication in the related art is applicable to only one transmitting terminal, and thereby multiple transmitting terminals can be supported.

What is claimed is:

1. A visible light signal receiving processing method, comprising: receiving, by a receiving terminal, a light signal, and converting the light signal to a digital signal;
   splitting, by the receiving terminal, the digital signal into a scrambled code signal and a light guide signal, wherein the light guide signal comprises identity information of a transmitting terminal; and
   decoding, by the receiving terminal, the scrambled code signal by using a pseudocode signal corresponding to the transmitting terminal, to obtain data transmitted by the transmitting terminal;
   wherein the decoding, by the receiving terminal, the scrambled code signal by using a pseudocode signal corresponding to the transmitting terminal, to obtain data transmitted by the transmitting terminal, comprises:
   acquiring, by the receiving terminal according to the identity information of the transmitting terminal, the pseudocode signal corresponding to the transmitting terminal, wherein, the identity information of the transmitting terminal is a device identity of the transmitting terminal; and
   decoding, by the receiving terminal, the scrambled code signal by using the pseudocode signal corresponding to the transmitting terminal;
   wherein the acquiring, by the receiving terminal, the pseudocode signal according to the identity information of the transmitting terminal, comprises:
   acquiring, by the receiving terminal according to the identity information of the transmitting terminal, a status code corresponding to the transmitting terminal; and
   obtaining, by the receiving terminal according to the status code corresponding to the transmitting terminal, a pseudocode signal corresponding to the status code.

2. The method according to claim 1, wherein in a case in which the data transmitted by the transmitting terminal comprises a user identity, after the receiving terminal obtains the user identity by decoding the scrambled code signal by using the pseudocode signal, the method further comprises:
   verifying, by the receiving terminal, whether the user identity received from the transmitting terminal is the same as or corresponds to a user identity prestored by the receiving terminal, and if the user identity received from the transmitting terminal is the same as or corresponds to the prestored user identity, then the user identity that is transmitted by the transmitting terminal is legal, or otherwise, the user identity that is transmitted by the transmitting terminal is illegal.

3. The method according to claim 1, wherein the method further comprises:
determining, by the receiving terminal according to a correspondence between transmitting terminal identity information and group, one or more groups to which the transmitting terminal belongs, wherein the one or more groups are used to indicate different rights of transmitting terminals that belong to the group; or
in a case in which the light guide signal further carries identity information of one or more groups to which the transmitting terminal belongs, determining, by the receiving terminal according to the identity information of the one or more groups that is carried in the light guide signal, the one or more groups to which the transmitting terminal belongs, wherein the one or more groups are used to indicate different rights of transmitting terminals that belong to the group.

4. A visible light signal receiving terminal, comprising:
a demodulator, configured to convert a received light signal into a digital signal;
a splitting apparatus, configured to split the digital signal into a scrambled code signal and a light guide signal, wherein the light guide signal comprises identity information of a transmitting terminal;
a pseudocode generator, configured to acquire a pseudocode signal; and
an arithmetic unit, configured to decode the scrambled code signal by using the pseudocode signal, to obtain data transmitted by the transmitting terminal;
wherein the pseudocode generator is configured to acquire the pseudocode signal according to the identity information of the transmitting terminal;
wherein the pseudocode generator is configured to acquire a corresponding status code according to the identity information of the transmitting terminal, and obtain, according to the status code, a pseudocode signal corresponding to the status code.

5. The receiving terminal according to claim 4, wherein the receiving terminal further comprises:
a decider, configured to: in a case in which the data transmitted by the transmitting terminal comprises a user identity, verify whether the user identity received from the transmitting terminal is the same as or corresponds to a user identity prestored by the receiving terminal, and if the user identity received from the transmitting terminal is the same as or corresponds to the prestored user identity, then the user identity that is transmitted by the transmitting terminal is legal, or otherwise, the user identity that is transmitted by the transmitting terminal is illegal.

6. The receiving terminal according to claim 4, wherein:
the receiving terminal is further configured to determine, according to a correspondence between transmitting terminal identity information and group, one or more groups to which the transmitting terminal belongs, wherein the one or more groups are used to indicate different rights of transmitting terminals that belong to the group; or
in a case in which the light guide signal further carries identity information of one or more groups to which the transmitting terminal belongs, the receiving terminal is further configured to determine, according to the identity information of the one or more groups that is carried in the light guide signal, the one or more groups to which the transmitting terminal belongs, wherein the one or more groups are used to indicate different rights of transmitting terminals that belong to the group.

7. The receiving terminal according to claim 4, wherein the identity information of the transmitting terminal is a device identity of the transmitting terminal.

* * * * *